(12) United States Patent
Yong (10) Patent No.: US 11,511,619 B2
(45) Date of Patent: Nov. 29, 2022

(54) RADIATOR SIDE MEMBER AND FRONT STRUCTURE OF VEHICLE BODY PROVIDED WITH THE SAME

(71) Applicants: HYUNDAI MOTOR COMPANY, Seoul (KR); KIA Motors Corporation, Seoul (KR)

(72) Inventor: Jiae Yong, Gangneung-si (KR)

(73) Assignees: HYUNDAI MOTOR COMPANY, Seoul (KR); Kia Motors Corporation, Seoul (KR)

(*) Notice: Subject to any disclaimer, the term of this patent is extended or adjusted under 35 U.S.C. 154(b) by 80 days.

(21) Appl. No.: 17/217,276

(22) Filed: Mar. 30, 2021

(65) Prior Publication Data
US 2022/0153126 A1    May 19, 2022

(30) Foreign Application Priority Data
Nov. 17, 2020    (KR) .................. 10-2020-0153905

(51) Int. Cl.
*B60K 11/04*    (2006.01)
*B60H 1/00*    (2006.01)

(52) U.S. Cl.
CPC .......... *B60K 11/04* (2013.01); *B60H 1/00521* (2013.01)

(58) Field of Classification Search
CPC ...... B60K 11/04; B62D 25/08; B62D 25/084; B62D 25/085; B60H 1/00521; B60Y 2304/05
See application file for complete search history.

(56) References Cited

U.S. PATENT DOCUMENTS

| | | | | |
|---|---|---|---|---|
| 5,671,803 A | * | 9/1997 | Tepas | F28F 9/002 165/41 |
| 2005/0082140 A1 | * | 4/2005 | Kim | B62D 25/084 193/9 |
| 2006/0009088 A1 | * | 1/2006 | Uchiyama | B62D 25/084 439/821 |
| 2013/0149119 A1 | * | 6/2013 | Seo | F28F 27/02 165/104.33 |
| 2013/0161979 A1 | * | 6/2013 | Abe | B62D 25/08 296/193.09 |
| 2014/0159429 A1 | * | 6/2014 | Chung | B62D 25/08 296/193.09 |
| 2016/0236562 A1 | * | 8/2016 | Iwamoto | B60K 11/04 |

FOREIGN PATENT DOCUMENTS

| | | | | | |
|---|---|---|---|---|---|
| CN | 1462703 A | * | 12/2003 | .......... | B62D 25/084 |
| CN | 1970329 A | * | 5/2007 | .......... | B62D 21/02 |
| EP | 1604887 A2 | * | 12/2005 | .......... | B60Q 1/0433 |
| JP | 2008260493 A | * | 10/2008 | .......... | B60K 11/04 |
| KR | 20110134702 A | * | 12/2011 | .......... | B62D 25/085 |
| WO | WO-2009119396 A1 | * | 10/2009 | .......... | B62D 25/084 |
| WO | WO-2017222019 A1 | * | 12/2017 | .......... | B62D 21/15 |

* cited by examiner

*Primary Examiner* — Hung Q Nguyen
(74) *Attorney, Agent, or Firm* — Lempia Summerfield Katz LLC (57) ABSTRACT

A radiator side member is applicable to a module type front structure of a vehicle body and a non-module type front structure of a vehicle body. In particular, the radiator side member includes: a radiator front panel portion disposed in the front direction of the vehicle body, a radiator side panel portion bent at the radiator front panel portion to form a side surface, and a radiator upper panel portion bent at the radiator front panel portion to form an upper surface.

12 Claims, 10 Drawing Sheets

RADIATOR SIDE MEMBER AND FRONT STRUCTURE OF VEHICLE BODY PROVIDED WITH THE SAME

CROSS-REFERENCE TO RELATED APPLICATION

This application claims priority to and the benefit of Korean Patent Application No. 10-2020-0153905, filed on Nov. 17, 2020, the entire contents of which are incorporated herein by reference.

FIELD

The present disclosure relates to a radiator side member and a front structure of a vehicle body including the same. More particularly, the present disclosure relates to a radiator side member applicable to various vehicle types and a front structure of a vehicle body including the same.

BACKGROUND

The statements in this section merely provide background information related to the present disclosure and may not constitute prior art.

The front of the vehicle has various structures according to types of vehicles, and even in the case of the same vehicle type, various vehicle front structures are provided depending on the region where the vehicle is produced or sold.

For example, the vehicle body front structure can be divided into a module type front structure of a vehicle body employing a front end module (FEM) and a non-module type vehicle body front structure.

For the same vehicle type, the required design specifications are various according to the production or sales region, and when designing and producing according to each required design specification, the development cost and parts cost increase.

The above information disclosed in this Background section is only for enhancement of understanding of the background of the present disclosure, and therefore it may contain information that does not form the prior art that is already known to a person of ordinary skill in the art.

SUMMARY

The present disclosure provides a radiator side member capable of reducing development cost and parts cost by being applicable to various vehicle types and a front structure of a vehicle body including the same.

A radiator side member according to an exemplary form of the present disclosure may be applied to a module type front structure of a vehicle body and a non-module type front structure of a vehicle body.

The radiator side member according to an exemplary form of the present disclosure may include: a radiator front panel portion disposed in the front direction of a vehicle, a radiator side panel portion bent at the front panel to form a side surface, and a radiator upper panel portion bent at the front panel portion to form an upper surface.

The radiator side member may include a lower body coupled with a front member, and an upper body whose width is narrower than a width of the lower body.

The radiator side member according to an exemplary form of the present disclosure may further include a plate portion coupled to the lower body.

The radiator side member according to an exemplary form of the present disclosure may further include an upper reinforce bracket formed in a "U" shape to connect the radiator side panel portion and the radiator upper panel portion.

A non-module type front structure of a vehicle body according to an exemplary form of the present disclosure may include a radiator side member including a radiator front panel portion disposed in the front direction of a vehicle, a radiator side panel portion bent at the front panel to form a side surface, and a radiator upper panel portion bent at the front panel portion to form an upper surface, a front member coupled with the radiator side member, and a plate portion provided between the radiator side member and the front member.

The non-module type front structure of a vehicle body according to an exemplary form of the present disclosure may further include an upper reinforce bracket formed in a "U" shape to connect the radiator side panel portion and the radiator upper panel portion.

The non-module type front structure of a vehicle body according to an exemplary form of the present disclosure may further include a support upper member that couples to the upper reinforce bracket.

The non-module type front structure of a vehicle body according to an exemplary form of the present disclosure may further include a lower reinforce member connected to the plate portion.

The non-module type front structure of a vehicle body according to an exemplary form of the present disclosure may further include a bumper beam mounted in front of the radiator side member, and the bumper beam, the radiator side member and the plate portion may be integrally combined.

A module type front structure of a vehicle body according to an exemplary form of the present disclosure may include a radiator side member including a radiator front panel portion disposed in the front direction of a vehicle, a radiator side panel portion bent at the front panel to form a side surface, and a radiator upper panel portion bent at the front panel portion to form an upper surface, a front end module carrier coupled with the radiator side member, and a front member coupled with the radiator side member.

The radiator side member and the front end module carrier may be combined by insert injection.

The module type front structure of a vehicle body according to an exemplary form of the present disclosure may further include a plate portion provided between the radiator side member and the front member.

According to the radiator side member according to an exemplary form of the present disclosure and the front structure of a vehicle body including the same, it is possible to reduce development and production costs by applying a common radiator side member to various types of front structure of a vehicle body required according to the production area and sales area.

According to the radiator side member according to an exemplary form of the present disclosure, it is applied to both the front structure of a vehicle body of a module type employing a front end module (FEM) and the front structure of a vehicle body of a non-module type.

In addition, effects that can be obtained or predicted by the forms of the present disclosure will be disclosed directly or implicitly in the detailed description of the forms of the present disclosure. That is, various effects predicted according to an exemplary form of the present disclosure will be disclosed within a detailed description to be described later.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration.

As those skilled in the art would realize, the described forms may be modified in various different ways, all without departing from the spirit or scope of the present disclosure Parts indicated by the same reference numerals throughout the specification mean the same components.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless specifically stated to the contrary.

An exemplary form of the present disclosure will hereinafter be described in detail with reference to the accompanying drawings.

Figure 1:
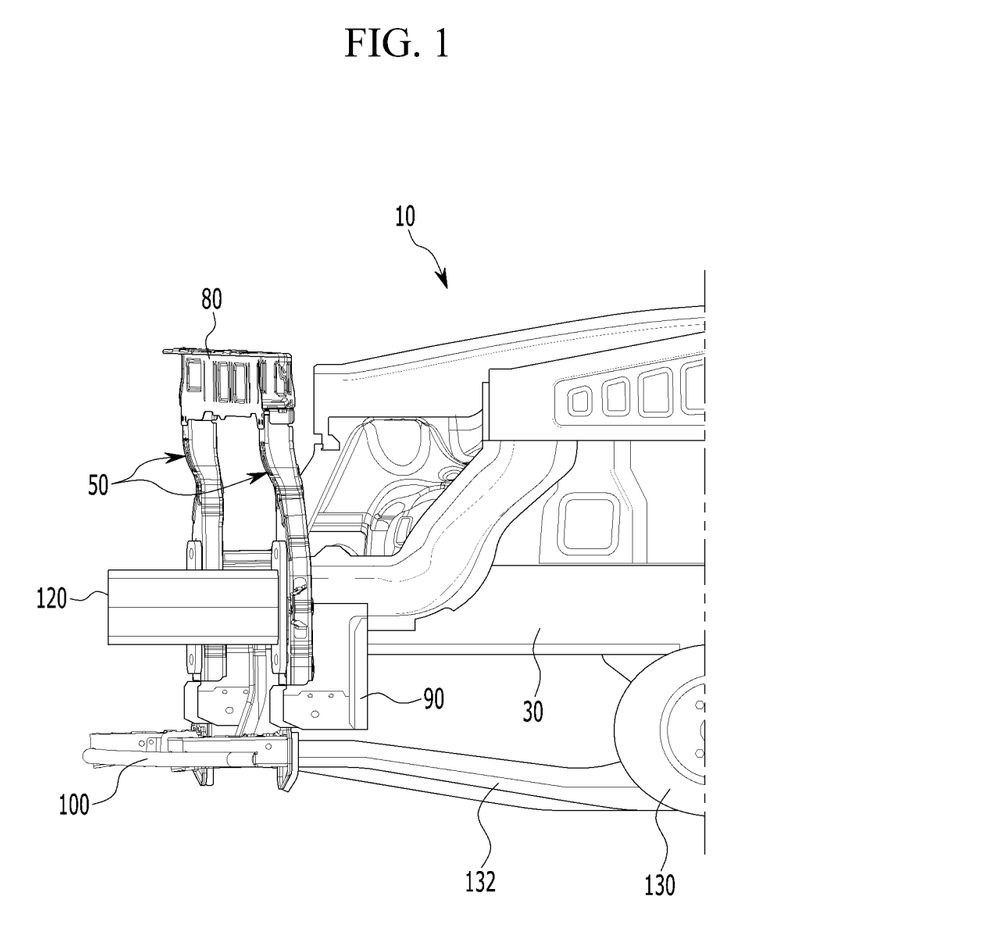
FIG. 1 is a perspective view of a front structure of a vehicle body to which a radiator side member according to one exemplary form of the present disclosure is applied.

FIG. 1 is a perspective view of a front structure of a vehicle body to which a radiator side member according to one exemplary form of the present disclosure is applied.

Referring to FIG. 1, in the front structure of a vehicle body 10 according to one exemplary form of the present disclosure, a radiator side member 50 is mounted on a front member 30, and a bumper beam 120 may be mounted in front of the radiator side member 50.

A lower reinforce member 90 may be mounted on the lower part of the radiator side member 50, and a support lower member 100 may be mounted on the lower reinforce member 90. And a sub-frame 130 may be connected to the lower reinforce member 90 and the support lower member 100 through a front element 132.

The front structure of a vehicle body 10 according to one exemplary form of the present disclosure shown in FIG. 1 is a non-module type, and the front element 132 and the lower reinforce member 90 corresponding to the front element 132 are applied, and can be used for vehicles produced and/or sold in areas where the requirements for vehicle collision performance are relatively critical.

A specific configuration of the radiator side member 50 according to one exemplary form of the present disclosure will be described later.

Figure 2:
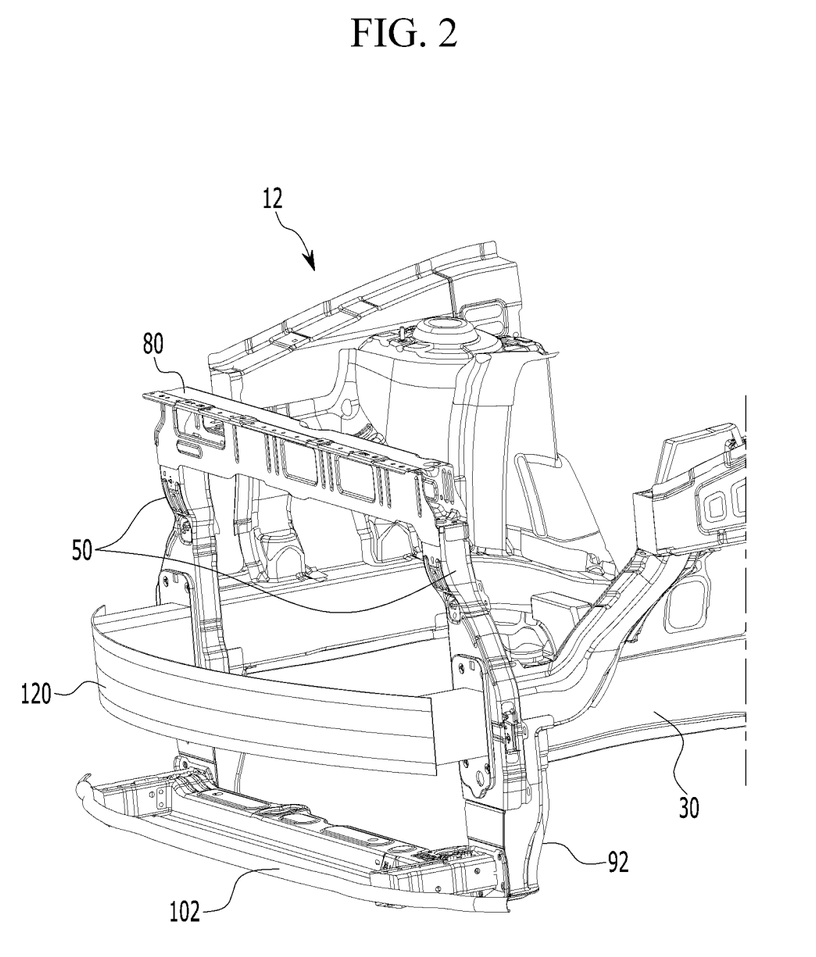
FIG. 2 is a perspective view of a front structure of a vehicle body to which a radiator side member according to one exemplary form of the present disclosure is applied.

FIG. 2 is a perspective view of a front structure of a vehicle body to which a radiator side member according to one exemplary form of the present disclosure is applied.

In describing the front structure of a vehicle body shown in FIG. 2, for convenience of understanding, the same/similar configurations as the front structure of a vehicle body described in FIG. 1 will be described using the same/similar reference numbers.

Referring to FIG. 2, in the front structure of a vehicle body 12 according to one exemplary form of the present disclosure, a radiator side member 50 in one exemplary form of the present disclosure is mounted on the front member 30, and a bumper beam 120 may be mounted in front of the radiator side member 50.

A lower reinforce member 92 may be mounted on the lower part of the radiator side member 50, and a support lower member 102 may be mounted on the lower reinforce member 92.

The front structure of a vehicle body 12 according to one exemplary form of the present disclosure shown in FIG. 2 is a non-module type, and the lower reinforce member 92, which is not connected to the front element, is applied, so it can be used for vehicles produced and/or sold in areas where the requirements for vehicle collision performance are relatively less demanding. That is, while the radiator side member 50 and the same the radiator side member 50 shown in FIG. 1 are used, only the lower reinforce member 92 required for the vehicle is applied differently, thereby reducing the cost of component development and the component price.

Figure 3A:
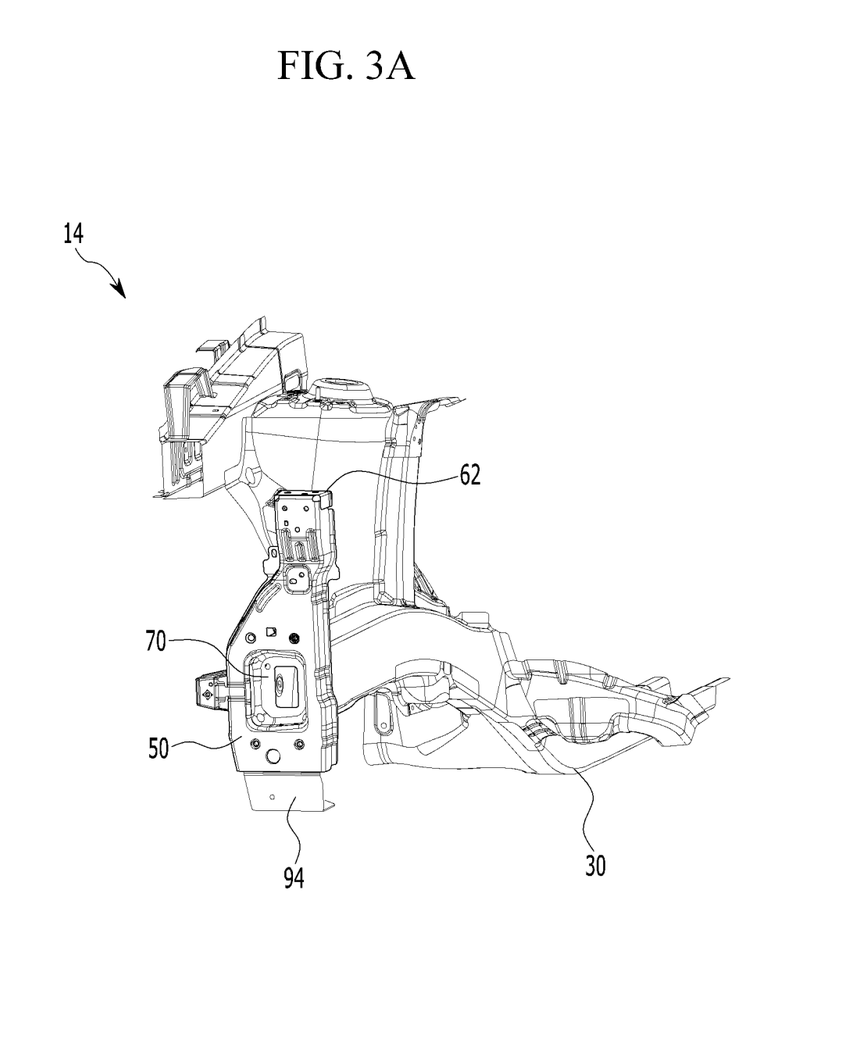
FIGS. 3A and 3B are perspective views of a front structure of a vehicle body to which a radiator side member according to one exemplary form of the present disclosure is applied.
Figure 3B:
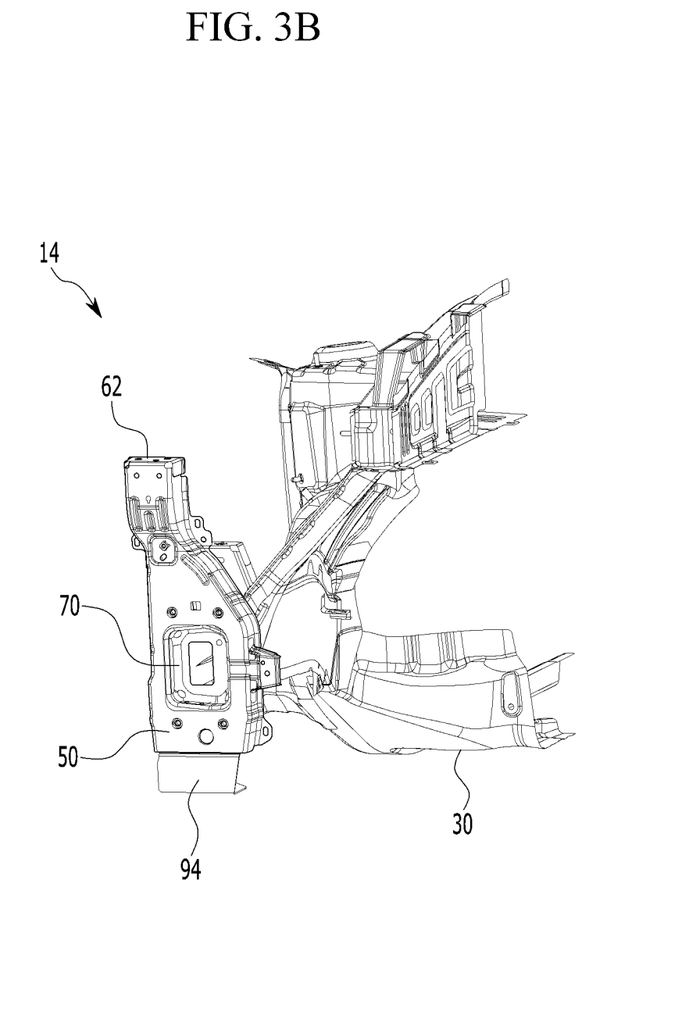
Figure 4:
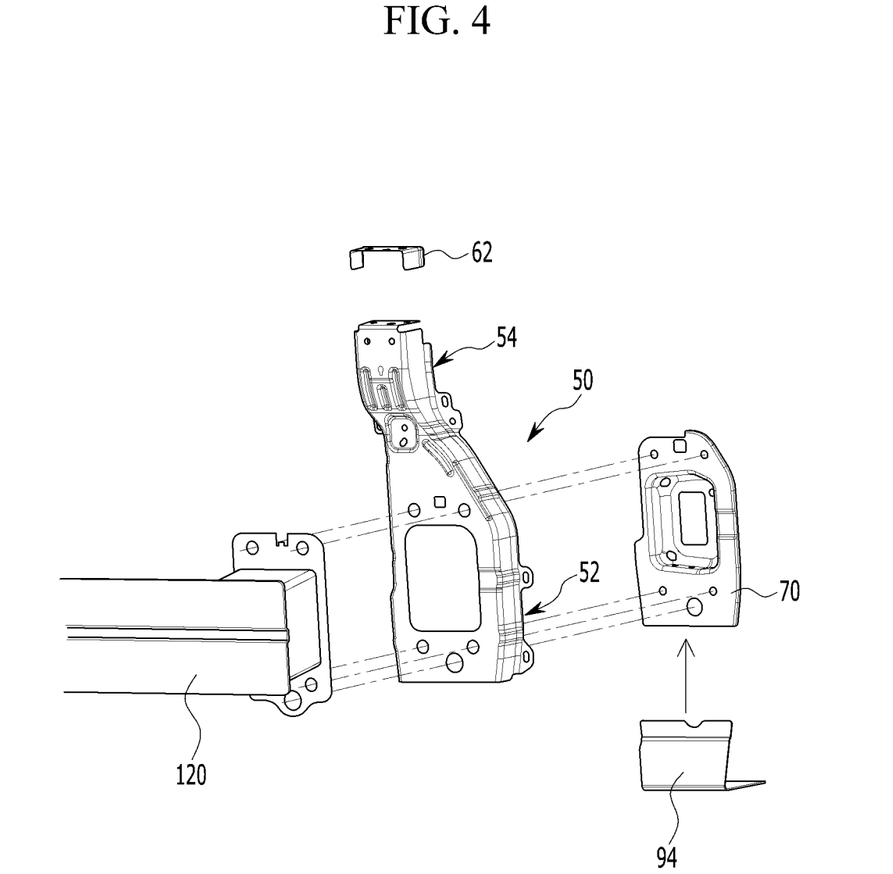
FIG. 4 is a partially exploded perspective view of the front structure of a vehicle body to which a radiator side member according to one exemplary form of the present disclosure is applied.

FIGS. 3A and 3B are perspective views of a front structure of a vehicle body to which a radiator side member according to one exemplary form of the present disclosure is applied, and FIG. 4 is a partially exploded perspective view of the front structure of a vehicle body to which a radiator side member according to one exemplary form of the present disclosure is applied.

Figure 5:
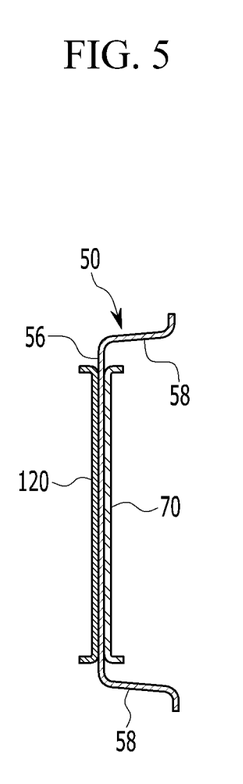
FIG. 5 is a cross-sectional view along the line V-V of FIG. 2.
Figure 6:
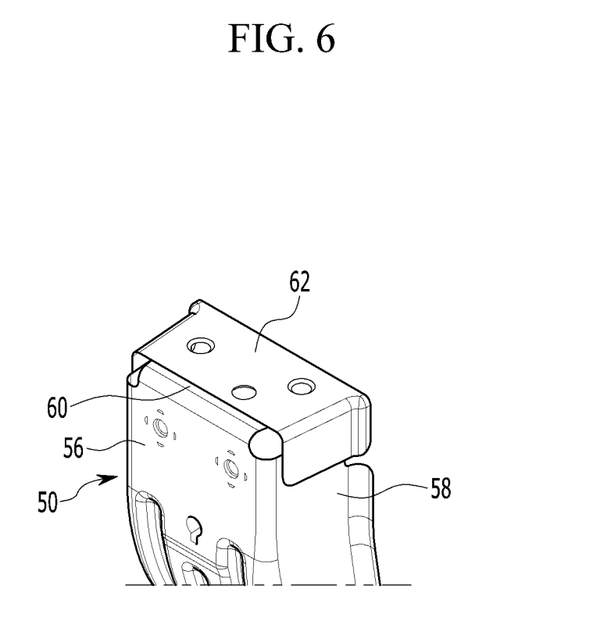
FIG. 6 is a partial perspective view of a radiator side member according to one exemplary form of the present disclosure.

FIG. 5 is a cross-sectional view along the line V-V of FIG. 2, and FIG. 6 is a partial perspective view of a radiator side member according to one exemplary form of the present disclosure.

In describing the front structure of a vehicle body shown in FIGS. 3A-3B to FIG. 6, for ease of understanding, the same/similar configurations as the front structure of a vehicle body described in FIG. 1 or FIG. 2 will be described using the same/similar reference numbers.

Referring to FIGS. 3A-3B to FIG. 6, in the front structure of a vehicle body 14 according to one exemplary form of the present disclosure, the radiator side member 50 according to one exemplary form of the present disclosure is mounted on the front member 30, and a lower reinforce member 94 may be mounted under the radiator side member 50.

Various types of the lower reinforce member 94 are mounted on the lower part of the radiator side member 50, which can be used in common, depending on the shape of the front structure of the vehicle or the required condition, so that it can be applied to various types of vehicle types or numerous variations of the same vehicle type.

In one form, the bumper beam 120 may be mounted at the front of the radiator side member 50 so as to receive an external impact in case of collision, and a plate portion 70 may be mounted at the rear of the radiator side member 50 to transmit the impact load in case of collision to the front member 30.

The radiator side member 50 may include a lower body 52 coupled to the front member 30, and an upper body 54 having a narrower width than a width of the lower body 52. That is, the lower body 52 has a relatively wider width than the upper body 54, so that the impact load transmitted from the bumper beam 120 can be distributed to the front member 30.

The radiator side member 50 may include a radiator front panel portion 56 disposed in a front direction of the vehicle (i.e., a front direction of the vehicle body), and a radiator side panel portion 58 that is bent at the radiator front panel portion 56 to form a side surface. The strength of the radiator side member 50 may be increased by the bending shape of the radiator side member 50.

That is, as shown in FIG. 5, the cross-section of the radiator side member 50 may be bent into a "U" shape to increase the strength of the radiator side member 50.

The radiator side member 50 may further include a radiator upper panel portion 60 that is bent at the radiator front panel portion 56 to form an upper surface. The bent radiator upper panel portion 60 may increase the strength of the radiator side member 50.

The radiator side member 50 according to an exemplary form of the present disclosure may further include an upper reinforce bracket 62 formed in a "U" shape to connect the radiator side panel portion 58 and the radiator upper panel portion 60. The upper strength of the radiator side member 50 can be increased by connecting the radiator side panel portion 58 and the radiator upper panel portion 60 using the upper reinforce bracket 62. The upper reinforce bracket 62 may be welded to the radiator side panel portion 58 and the radiator upper panel portion 60.

Referring to FIG. 4 and FIG. 5, the bumper beam 120, the radiator side member 50 and the plate portion 70 are integrally combined so that when a vehicle crashes, the impact load from the bumper beam 120 can be distributed to the vehicle body through the radiator side member 50 and the plate portion 70.

The lower reinforce member 94 may be connected to the plate portion 70. That is, in the case of a vehicle type requiring the mount of the lower reinforce member 94, the lower reinforce member 94 may be mounted to the radiator side member 50 through the plate portion 70. In this case, it is not necessary to separate the shape of the radiator side member 50 according to the vehicle type, so that the manufacturing cost of the radiator side member 50 can be lowered.

Figure 7:
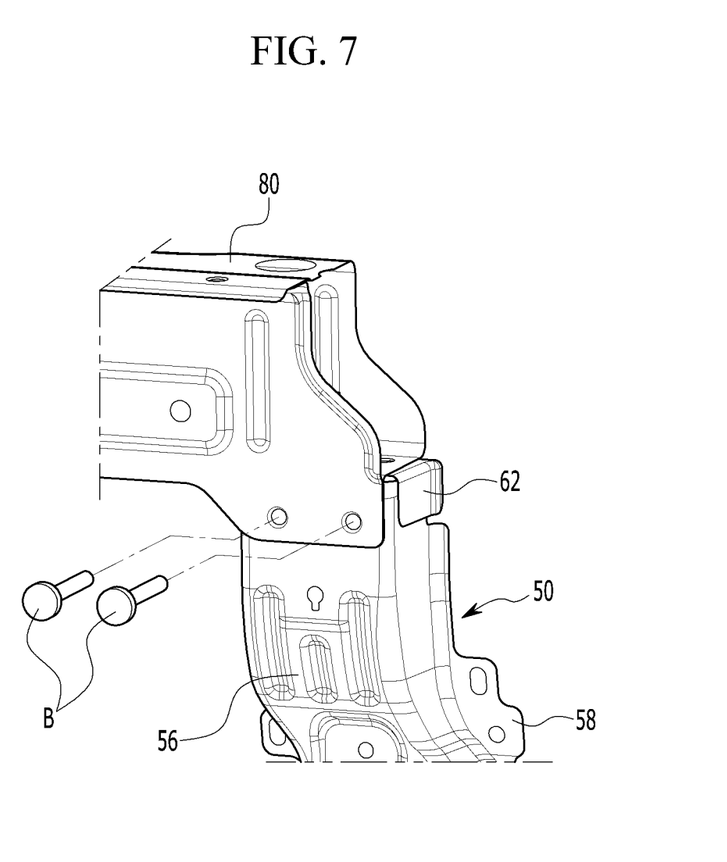
FIG. 7 is a partial perspective view of a front structure of a vehicle body to which the radiator side member according to one exemplary form of the present disclosure is applied.

FIG. 7 is a partial perspective view of a front structure of a vehicle body to which the radiator side member according to one exemplary form of the present disclosure is applied.

As shown in FIG. 7, by combining the support upper member 80 with the radiator side member 50 whose strength is increased by the upper reinforce bracket 62, the combination of the radiator side member 50 and the support upper member 80 can be made more robust. The radiator side member 50 and the support upper member 80 can be combined with a bolt B, simplifying the manufacturing process.

Figure 8:
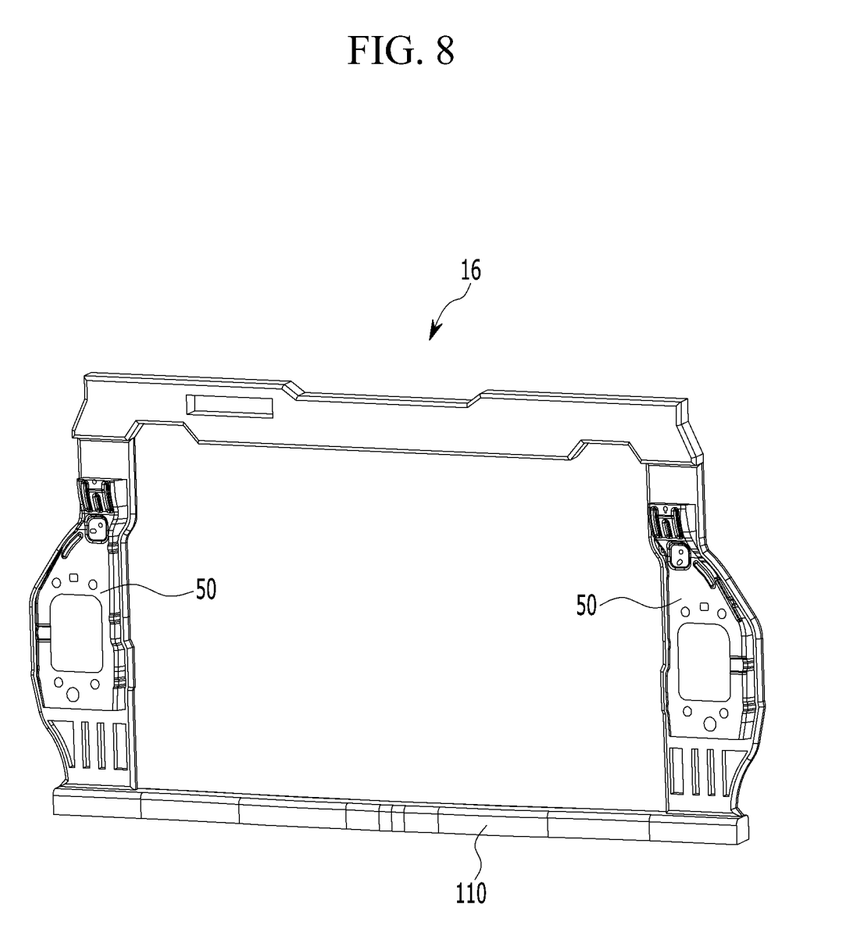
FIG. 8 is a partial perspective view of a front structure of a vehicle body to which the radiator side member according to one exemplary form of the present disclosure is applied.
Figure 9:
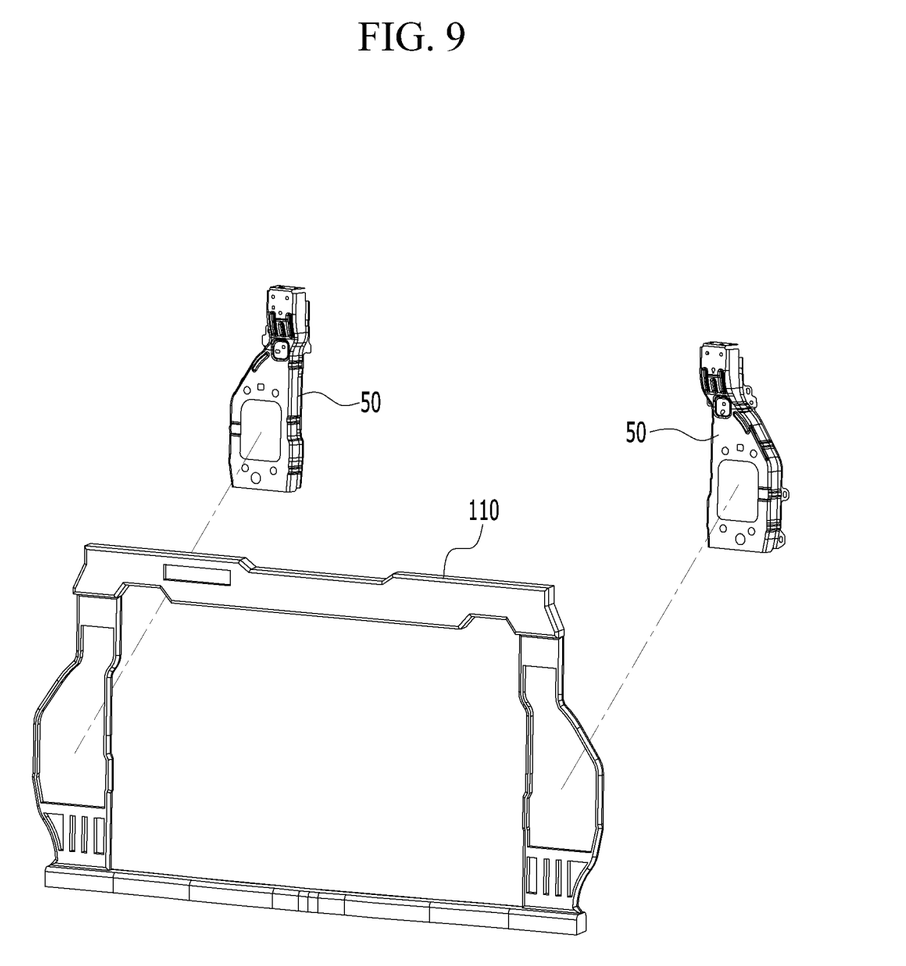
FIG. 9 is an exploded perspective view of a front structure of a vehicle body to which the radiator side member according to one exemplary form of the present disclosure is applied.

FIG. 8 is a partial perspective view of a front structure of a vehicle body to which the radiator side member according to one exemplary form of the present disclosure is applied, and FIG. 9 is an exploded perspective view of a front structure of a vehicle body to which the radiator side member according to one exemplary form of the present disclosure is applied.

In describing the front structure of a vehicle body shown in FIG. 8 to FIG. 9, for ease of understanding, the same/similar configurations as the front structure of a vehicle body described in FIG. 1 to FIG. 7 will be described using the same/similar reference numbers.

The front structure of a vehicle body 14 according to one exemplary form of the present disclosure is a module type, and includes the radiator side member 50 according to an exemplary form of the present disclosure described above, and a front end module carrier 110 coupled to the radiator side member 50.

The front member 30 described above may be mounted on the radiator side member 50, and the bumper beam 120 may be mounted in front of the radiator side member 50. In addition, the plate portion 70 may be mounted between the radiator side member 50 and the front member 30 to transmit an impact load to the front member 30 in the event of a collision.

The radiator side member 50 and the front end module carrier 110 can be combined by insert injection.

That is, the radiator side member 50 described above may be applied to the front structure of a vehicle body of the module type, thus, is possible to increase the strength of the front structure of a vehicle body 14 according to one exemplary form of the present disclosure by firmly combining with the front end module carrier 110 through the "U"-shaped cross-section of the radiator side member 50.

As described above, the front structure of a vehicle body 10, 12, 14, and 16 according to one exemplary form of the present disclosure applies the radiator side member 50, which can be used in common, to provide a variety of module or non-module types. Therefore, it can be applied to various vehicle types of module or non-module type or vehicle types of numerous exemplary variations of the same vehicle type, thereby reducing development cost and parts cost.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

DESCRIPTION OF SYMBOLS

| | |
|---|---|
| 10, 12, 14, 16: vehicle body | 30: front member |
| 50: radiator side member | 52: lower body |
| 54: upper body | 56: radiator front panel portion |
| 58: radiator side panel portion | 60: radiator upper panel portion |
| 62: upper reinforce bracket | 70: plate portion |
| 80: support upper member | 90, 92, 94: lower reinforce member |
| 100, 102: support lower member | 110: front end module carrier |
| 120: bumper beam | 130: sub-frame |
| 132: front element | |

What is claimed is:

1. A radiator side member applicable to a module type front structure of a vehicle body and a non-module type front structure of a vehicle body, the radiator side member comprising:
   a radiator front panel portion disposed in a front direction of the vehicle body;
   a radiator side panel portion bent at the radiator front panel portion to form a side surface; and
   a radiator upper panel portion bent at the radiator front panel portion to form an upper surface.

2. The radiator side member of claim 1, further comprising:
   a lower body coupled with a front member; and
   an upper body whose width is narrower than a width of the lower body.

3. The radiator side member of claim 2, further comprising a plate portion coupled to the lower body.

4. The radiator side member of claim 1, further comprising an upper reinforce bracket formed in a "U" shape to connect the radiator side panel portion and the radiator upper panel portion.

5. A non-module type front structure of a vehicle body, comprising:
   a radiator side member including a radiator front panel portion disposed in a front direction of the vehicle body, a radiator side panel portion bent at the radiator front panel portion to form a side surface, and a radiator upper panel portion bent at the radiator front panel portion to form an upper surface;
   a front member coupled with the radiator side member; and
   a plate portion provided between the radiator side member and the front member.

6. The non-module type front structure of claim 5, further comprising an upper reinforce bracket formed in a "U" shape to connect the radiator side panel portion and the radiator upper panel portion.

7. The non-module type front structure of claim 6, further comprising a support upper member coupled to the upper reinforce bracket.

8. The non-module type front structure of claim 5, further comprising a lower reinforce member connected to the plate portion.

9. The non-module type front structure of claim 5, further comprising a bumper beam mounted in front of the radiator side member,
   wherein, the bumper beam, the radiator side member and the plate portion are integrally combined.

10. A module type front structure of a vehicle body, comprising:
    a radiator side member including a radiator front panel portion disposed in a front direction of the vehicle body, a radiator side panel portion bent at the radiator front panel portion to form a side surface, and a radiator upper panel portion bent at the radiator front panel portion to form an upper surface;
    a front end module carrier coupled with the radiator side member; and
    a front member coupled with the radiator side member.

11. The module type front structure of claim 10, wherein the radiator side member and the front end module carrier are combined by insert injection.

12. The module type front structure of claim 10, further comprising a plate portion provided between the radiator side member and the front member.

* * * * *